2,786,017
Patented Mar. 19, 1957

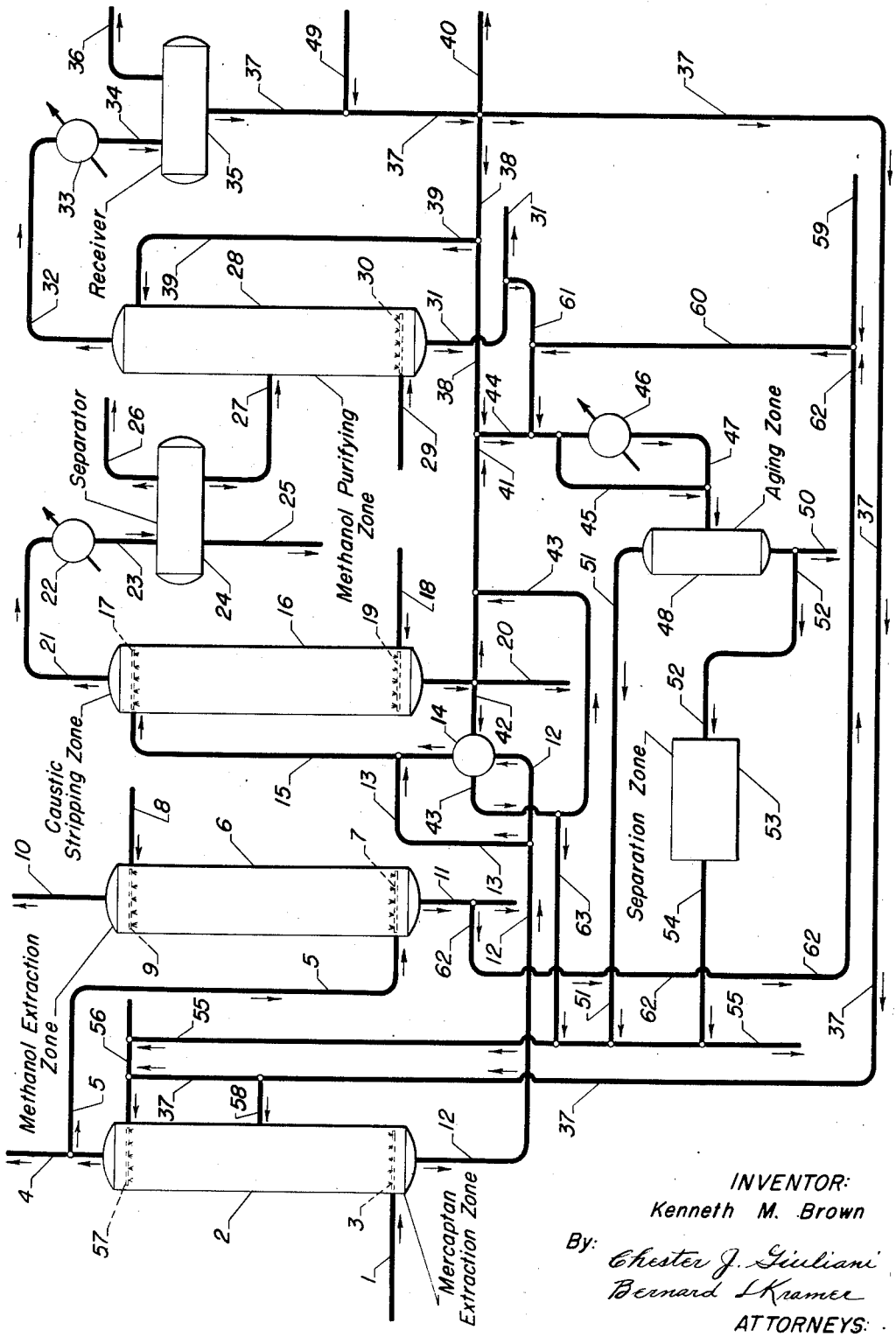

2,786,017

METHOD OF PREVENTING PLUGGING IN ALKALI TREATMENT OF HYDROCARBONS

Kenneth M. Brown, Hinsdale, Ill., assignor to Universal Oil Products Company, Des Plaines, Ill., a corporation of Delaware Application November 19, 1953, Serial No. 393,106

9 Claims. (Cl. 196—32)

This invention relates to the treatment of hydrocarbons and more particularly to an improved method of avoiding plugging difficulties heretofore encountered in the treatment of hydrocarbons by means of an alkaline reagent solution.

In the process of treating hydrocarbon oils to remove acidic components and particularly mercaptans, wherein the hydrocarbon oil is contacted with a reagent solution comprising caustic and methanol, deposition of precipitate occurs in the extractor and results in plugging difficulties, necessitating discontinuance of the process. The improved method of the present invention avoids these difficulties and permits continuous operation of the process for longer periods of time without requiring shutdown because of plugging difficulties.

In one embodiment the present invention relates to an improvement in a process for removing acidic components from hydrocarbons by treating said hydrocarbons with an alkaline reagent solution under conditions whereby the concentration of said alkaline reagent solution is lowered, the method of avoiding plugging difficulties during said treating which comprises separately diluting the alkaline reagent solution and thereby forming a precipitate, separating the alkaline reagent solution from said precipitate, and utilizing said separated alkaline solution to treat hydrocarbons as aforesaid.

In a specific embodiment the present invention relates to an improvement in the process for removing mercaptans from gasoline by treating said gasoline with caustic-methanol solution, separating caustic-methanol solution from treated oil, regenerating the caustic solution by separating therefrom mercaptans and methanol, and further separating methanol from mercaptans, the method of avoiding plugging difficulties in treating the gasoline which comprises commingling at least a portion of the separated methanol with at least a portion of the regenerated caustic solution, thereby forming a precipitate, separating the caustic-methanol solution from the precipitate, and utilizing said separated caustic-methanol solution for treating gasoline as aforesaid.

While any suitable alkaline reagent, including sodium hydroxide, potassium hydroxide, etc., and any suitable organic solvent which is more soluble in an aqueous solution of an alkaline reagent then in hydrocarbons, including methanol, ethanol, propanol, acetone, ethylene glycol, glycol ethers, etc., may be used, the preferred treating reagent comprises an aqueous solution of sodium hydroxide and methanol.

In accordance with the present invention, hydrocarbon fractions containing acidic components are treated with the alkaline-solvent solution at a temperature above the freezing point of the solution, which temperature is generally within the range of 80° to about 110° F., although, in some cases lower or higher temperatures may be used but the temperature generally will not be below about 25° F. and not above about 200° F. When treating gasoline, the pressure employed is usually within the range of from about 25 to about 200 pounds, although, lower or higher pressures may be used in some cases.

As hereinbefore set forth the preferred treating reagent comprises an aqueous solution of sodium hydroxide and methanol. The volume of sodium hydroxide solution used may range from about 0.5% to 10% or more based on the hydrocarbons to be treated, while the sodium hydroxide solution gravity may be between about 35° and about 50° Baumé and preferably between 45° and 50° Baumé. The methanol employed may be anhydrous or it may contain varying amounts of water. However, as the water content of the methanol fraction is increased, the concentration of the sodium hydroxide solution should be increased accordingly.

In accordance with the invention, gasoline containing mercaptans and usually also containing phenols are contacted with the caustic-methanol solution under the conditions hereinbefore set forth. Sodium mercaptides and phenolates are formed and are dissolved in the caustic-methanol solution. This solution is then separated from the hydrocarbons, the caustic being regenerated, usually by stripping with steam, to convert the mercaptides into sodium hydroxide and mercaptans. The mercaptans, methanol and water are separated from the caustic. The mercaptans are separated from the water-alcohol mixture, usually by settling under controlled conditions which prevent turbulence. The methanol and water mixture then is subjected to distillation to separate an overhead fraction comprising methanol and a bottoms fraction comprising water.

In accordance with the present invention, the regenerated caustic solution is diluted with a suitable medium and sent to an aging zone, wherein precipitate formation occurs. The precipitate will vary depending upon the inorganic impurities introduced into the system and may comprise, for example, iron sulfide, sodium carbonate, salts of aliphatic and naphthenic acids, etc., and mixtures thereof. The caustic solution is separated from the precipitate in any suitable manner, and the caustic solution then is used to treat further quantities of gasoline. Any suitable method of diluting may be used for this purpose. In a preferred manner, methanol separated within the process in the manner hereinbefore set forth advantageously is utilized for this purpose, and the resultant caustic-methanol solution, after separation from the precipitate, is utilized to treat further quantities of gasoline. In another embodiment water, either introduced from na extraneous source but preferably recovered from within the system, is used to dilute the regenerated caustic solution. It is understood that any other suitable diluent may be employed but, for economic reasons, it generally is preferred to utilize a liquid recovered from within the system and subsequently reused therein.

The invention is illustrated further in the accompanying diagrammatic flow drawing and in the following description of specific operations of the process. In the interest of simplicity the following description will be limited to the treatment of gasoline by means of a caustic-methanol solution, although it is understood that other hydrocarbon fractions, either normally gaseous or normally liquid, may be treated in the process and that other suitable alkaline reagents and organic solvents may be employed but not necessarily with equivalent results. Other hydrocarbon distillates for treatment in accordance with the present invention may comprise kerosene, heater oil, diesel oil, burner oil, selected aromatic fractions, including benzene, toluene, xylene, etc., and mixtures thereof. Further, in the interest of simplicity, valves, pumps, mixers and the like have been omitted from the drawing.

Referring to the drawing, gasoline or other charging stock is introduced to the process through line 1 and is directed into the lower portion of mercaptan extraction zone 2, preferably by means of a suitable spray arrangement as illustrated at 3. Extraction zone 2 may comprise one or a plurality of suitable zones, which may be vertical, horizontal, etc., and which preferably contains suitable packing material and/or contacting means, including baffles, side to side pans, bubble trays, bubble decks, etc. In the vertical zone, a packing material preferably is employed and should be one that will not be detrimentally affected by the caustic-methanol and hydrocarbons at the operating conditions prevailing in this zone, a particularly suitable packing material comprising carbon Raschig rings.

In zone 2, the gasoline flows upwardly in intimate contact with the caustic-methanol solution introduced into zone 2 in the manner to be hereinafter set forth, depending upon the particular method utilized in diluting the regenerated caustic. During contact of the gasoline with the caustic-methanol solution, acidic organic compounds, such as mercaptans and phenols contained in the gasoline, are converted into sodium mercaptides and phenolates and are dissolved in the caustic-methanol solution. The rates of flow of the gasoline, caustic and methanol are so adjusted that the treated gasoline being withdrawn through line 4 from the upper portion of zone 2 contains substantially less mercaptans than the gasoline introduced through line 1 and, in a preferred embodiment of the invention, the treated gasoline removed through line 4 will be substantially doctor sweet.

In some cases and particularly when both the caustic and methanol are introduced as a mixture into extraction zone 2, the treated gasoline being withdrawn through line 4 may contain dissolved methanol in a quantity sufficient to justify further treatment to remove the methanol from the gasoline and also to recover the methanol. This may be accomplished readily by water washing the treated gasoline. As illustrated, the treated gasoline is directed through line 5 into methanol extraction zone 6, preferably through a suitable spray arrangement as shown at 7. Water, from extraneous source and/or preferably recovered from within the process in any suitable manner not illustrated, is introduced through line 8 into extraction zone 6, preferably through a suitable spray arrangement as illustrated at 9. The treated gasoline, now substantially reduced in mercaptan and methanol content, is withdrawn from the upper portion of zone 6 by way of line 10. Water containing methanol is withdrawn from the lower portion of zone 6 through line 11 and may be removed from the process but preferably is supplied by well-known means, not illustrated, to caustic stripping and/or methanol purifying zones for recovery of the methanol and of the water, when desired, for reuse in the process.

Spent treating solution, comprising aqueous alcoholic solution containing unreacted sodium hydroxide, sodium mercaptides, sodium phenolates and methanol, is withdrawn from the lower portion of zone 2 through line 12 and is directed through line 13 and/or through heat exchanger 14 into line 15 and then to caustic stripping zone 16, preferably through a suitable spray arrangement as illustrated at 17. Zone 16, preferably contains a suitable packing material, which conveniently may comprise carbon Raschig rings and also may contain bubble trays, side to side pans, etc. In zone 16, the treating solution is subjected to regeneration by heat which, in the case here illustrated, comprises stripping with steam introduced through line 18 and preferably directed through a suitable spray arrangement as indicated at 19. In place of steam introduced from an extraneous source, the heating in the lower portion of zone 16 may be accomplished by using a conventional reboiler in communication with the material in the lower portion of the stripping zone. In the latter operation, water is introduced into the lower portion of the stripping zone, the water advantageously being recovered from within the system. The temperature maintained in the lower portion of zone 16 is substantially the boiling point of the treating solution which, with a 48° Baumé sodium hydroxide solution, will be of the order of 285° F. The temperature in the top of the stripping zone may be of the order of 200° to 250° F., depending in part on the temperature of the spent treating solution introduced thereto through line 15.

As a result of the heating, the sodium mercaptides are decomposed to mercaptans, with the liberation of an equivalent amount of sodium hydroxide. The sodium hydroxide is withdrawn from the lower portion of zone 16 through line 20 and may be removed from the process but, in accordance with the present invention, at least a portion thereof is subjected to treatment in the manner to be hereinafter set forth in order to avoid precipitate formation upon recycling of the regenerated caustic to the mercaptan extraction zone.

The mercaptans, methanol and water are vaporized in zone 16 and are directed therefrom through line 21 into and through condenser 22 and line 23 to separator 24. The condensate is permitted to settle and stratify in separator 24, whereby a mercaptan fraction is separated from a methanol-water fraction. Traces of gasoline which may have been carried over will be admixed with the mercaptan fraction, and this fraction is removed from separator 24 through line 25. Separator 24 also is provided with conventional vent line 26.

The methanol-water fraction is withdrawn from separator 24 by means of line 27 and is directed into methanol purifying zone 28. In zone 28 the methanol-water fraction is subjected to heating and distillation by any suitable means such as steam introduced through line 29, preferably by way of a spray device indicated at 30, or by conventional reboiler means or in any other suitable method. In zone 28 methanol is separated from water and the latter is removed through line 31. The water, all or in part, may be sent to disposal, used to dilute the regenerated caustic in the manner to be hereinafter described, supplied to the lower portion of the caustic stripping zone and/or used to water wash the treated gasoline in zone 6. Whatever phenols are vaporized and distilled overhead from stripping zone 16 will be removed through line 31 with the water. Methanol, along with a small amount of water and mercaptans, is removed from the upper portion of zone 28 through line 32 and directed into and through condenser 33 and line 34 into receiver 35 having conventional vent line 36. The methanol fraction is withdrawn from receiver 35 through line 37. Preferably at least a portion thereof is recycled by way of lines 38 and 39 to the upper portion of zone 28 to serve as a cooling and refluxing medium therein. While the remaining portion of the methanol fraction may be removed from the process through line 40, in accordance with one embodiment of the present invention at least a portion thereof is utilized to dilute the regenerated caustic in the manner to be hereinafter set forth.

In accordance with the present invention the regenerated caustic solution withdrawn through line 20 from lower portion of stripping zone 16 is directed, all or in part, by way of line 41 and/or by way of line 42, heat exchanger 14, line 43 and line 41, to be diluted in the manner to be hereinafter set forth. In a preferred embodiment, the regenerated caustic is diluted with methanol and preferably the methanol fraction withdrawn through line 37 from receiver 35. In the case here illustrated, the methanol fraction is supplied by way of line 38 to commingle with the regenerated caustic being directed through line 41, and the mixture is passed through line 44 and line 45 and/or through cooler 46 and line 47 into aging zone 48. Upon commingling the methanol with the regenerated caustic, heat is liberated and, when it is desired to effect the aging at a lower temperature, the mixture preferably is passed through cooler 46. In this case, it also may be preferred to cool the regenerated caustic in heat exchanger 14 before being commingled with the methanol. On the other hand, when higher temperature aging is desired, cooler 46 and/or heat exchanger 14 may be by-passed in the manner illustrated in the drawing. The time and temperature of aging will depend upon the particular precipitate formed in the system and thus may range from 10 minutes to 12 hours or more and a temperature of from atmospheric to about 200° F. When desired, all or a portion of the methanol may be supplied from an extraneous source and introduced by way of line 49 and then commingled with the regenerated caustic solution in the manner hereinbefore described.

The regenerated caustic solution in line 41 will be between about 35° and 50° Baumé and preferably between 45° and 50° Baumé. It is admixed with the diluent and is allowed to age for sufficient time to effect precipitate formation. The caustic solution may be separated from precipitate in any suitable manner, one method being to allow the precipitate to settle to the lower portion of zone 48 and withdrawing the same through line 50, while the caustic solution, free from precipitate is withdrawn from the upper portion of zone 48 through line 51. In this method, zone 48 preferably provides a quiescent zone, sufficient mixing of the caustic and methanol being accomplished while passing through line 44, cooler 46 and line 47. In another method, separation of the alkaline solution from the precipitate is accomplished by filtering or the like and, in such case, additional mixing may be desired in zone 48 and this may be accomplished by providing suitable mixing means therein. A rotating stirrer, not illustrated, may be provided in zone 48 or provision may be made for recirculating the material from the lower portion of zone 48 to the upper portion thereof, or any other suitable method of mixing may be utilized. In the latter method of separating the alkaline solution from the precipitate, the alkaline solution and precipitate suspended therein are withdrawn from zone 48 through line 50 and passed through line 52 to separation zone 53. Zone 53 may comprise any suitable method of separating the precipitate from the alkaline solution and may comprise, for example, a filtering zone utilizing any suitable adsorbent material, including sand, clay, bauxite, silica, alumina, silica-alumina, etc., or it may comprise a conventional filter press, or a centrifugal separator or any other suitable means. The alkaline solution free from precipitate is withdrawn from separation zone 53 by way of line 54.

When methanol is utilized to dilute the regenerated caustic solution, the mixture of caustic solution and methanol may be directed either from line 51 or line 54, depending upon the method used to separate out the precipitate, into line 55 and all or a portion may be withdrawn from the process through the lower portion of this line but at least a portion of the caustic-methanol solution is directed through line 56 into mercaptan extraction zone 2, preferably through a suitable spray arrangement as illustrated at 57. In one embodiment, the methanol is commingled with the regenerated caustic in the amount desired for use in mercaptan extraction zone. In another embodiment the amount of methanol commingled with the regenerated caustic solution is less than that desired in the extraction zone and, in such case, additional methanol may be directed by way of line 37 and introduced into zone 2 either to the upper portion thereof through line 56 and/or at an intermediate portion thereof through line 58.

As an alternative but not necessarily equivalent method of operation, water may be utilized as the diluent. In this method, methanol from receiver 35 may be recycled by way of line 37 and line 56 and/or line 58 into zone 2. Water to be commingled with the regenerated caustic solution may be obtained from an extraneous source and introduced into the process by way of line 59 and directed through line 60, but preferably water recovered from within the system is utilized. In the latter case, it may comprise water withdrawn from methanol purifying zone 28 by way of line 31 and directed through line 61. In still another embodiment, it may comprise water withdrawn through line 11 from methanol extraction zone 6 and directed through lines 62, 60 and 61. In the latter case, the water will contain methanol and, in still another embodiment, methanol from line 38 may be commingled with the water. Regardless of the source of water, the water is directed through line 61 to commingle with the regenerated caustic from line 41 and then is passed either through line 44, cooler 46 and line 47 or through lines 45 and 47 into aging zone 48. Separation of the precipitate may be effected in the manner hereinbefore set forth and the diluted caustic solution, free from precipitate, will have to be distilled or otherwise treated to reconcentrate the caustic solution to the strength desired for use in mercaptan extraction zone 2. This may be accomplished by passing the diluted caustic solution through the lower portion of line 55 into suitable concentrating means, not illustrated, and then returning the concentrated caustic solution into the system by way of line 56 or in any other suitable manner.

In still another embodiment, a portion of the regenerated caustic solution withdrawn from line 20 may be recycled directly to extraction zone 2 by way of lines 20 and 42, exchanger 14 and lines 43, 63, 55 and 56. The remaining portion of the regenerated caustic solution is diluted with methanol and/or water in the manner hereinbefore set forth. This method will reduce the precipitate deposition in extraction zone 2 to an extent proportional to the amount of regenerated caustic subject to dilution and aging. When water is used for dilution in this method of operation, the diluted caustic solution may be recycled to caustic stripping zone 16 and the caustic solution reconcentrated therein. It is understood that this method generally will be satisfactory in operations where precipitate deposition is not too excessive and where this method retards sufficient precipitate deposition to permit the use of methanol in the extraction zone in a slightly higher concentration then otherwise permissible.

Usually regenerated caustic is recycled within the process in the manner hereinbefore set forth. However, it is understood that make-up caustic may be introduced into extraction zone 2 by way of line 56 to replace the caustic lost and withdrawn from the process. Likewise, methanol from an extraneous source may be introduced into the system through line 49 to replace the methanol lost and withdrawn from the process.

While the description of the drawing has been directed to operations in which regenerated caustic solution is treated to avoid precipitate deposition, it is understood that fresh caustic may be treated in a similar manner prior to use in the process.

From the hereinbefore description it is apparent that the present invention provides a novel method for avoiding plugging difficulties encountered in extraction zone 2 due to precipitate formation upon dilution of the concentrated caustic solution by methanol. In the absence of the novel method of the present invention, precipitate deposition occurs in the extraction zone and the precipitate appears as an emulsion floating on the interface between the gasoline and caustic phases. Settling of the precipitate is prevented because it appears to float on top of the aqueous phase and therefore the precipitate will not sink to the bottom of the extraction zone for removal with the spent caustic solution but instead continues to accumulate to the point that flow of the gasoline and caustic-methanol is prevented, resulting in the necessity of shutting down the unit.

The following example is introduced to illustrate further the novelty and utility of the present invention but not with the intention of unduly limiting the same:

A cracked gasoline containing 0.08% by weight of mercaptan sulfur is introduced at a flow rate of 600 barrels per day into the lower portion of extraction zone 2, and 24 barrels per day of aqueous sodium hydroxide of 48° Baumé and 12 barrels per day of methanol are introduced into the upper portion thereof. The extraction zone is maintained at a temperature of about 110° F. and a pressure of 75 pounds per square inch. The treated gasoline is continuously withdrawn from zone 2 and is washed in zone 6 with water withdrawn from zone 28, and the enriched water is supplied to zone 19.

The spent treating solution is removed from the lower portion of zone 2, is heated to a temperature of 230° F. by heat exchange and is regenerated in zone 16, the latter being heated by a reboiler. The bottom temperature of zone 16 is about 295° F. and a top temperature is about 235° F. The vaporized mercaptans, methanol and water are removed from the upper portion of the stripping zone, cooled to a temperature of about 100° F., and allowed to settle and stratify in separator 24. The methanol-water fraction from the separator is supplied to zone 28, wherein it is distilled, utilizing a bottom temperature of about 225° F. and a top temperature of about 165° F.

Approximately 24 barrels per day of regenerated caustic solution withdrawn from zone 16, and approximately 12 barrels per day of methanol withdrawn from receiver 35, are commingled, cooled and introduced into aging zone 48. The flow rates are controlled so that the mixture is allowed a residence time in zone 48 of about one hour. Regenerated caustic and methanol solution is continuously withdrawn from the upper portion of zone 48 and recycled to mercaptan extraction zone 2.

The treated gasoline will be substantially doctor sweet. By utilizing the novel features of the present invention, the process may be operated continuously for a period of about 12–24 weeks, in contrast to operations which had to be shut down after 2–3 weeks because of plugging difficulties in the extraction zone.

I claim as my invention:

1. In a process for the removing of mercaptans from gasoline by treating with caustic-methanol solution, separating caustic-methanol solution from treated oil, regenerating caustic solution by separating therefrom mercaptans and methanol, and further separating methanol from mercaptans, the method of avoiding plugging difficulties in treating the gasoline which comprises commingling at least a portion of the separated methanol with at least a portion of the regenerated caustic solution, passing the resultant mixture into an aging zone and retaining the same therein for a time of from about 10 minutes to about 12 hours at a temperature of from about atmospheric to about 200° F. whereby precipitate is formed and settles to the lower portion of said zone, removing caustic-methanol solution from the upper portion of said zone, and utilizing said caustic-methanol solution to treat gasoline as aforesaid.

2. In a process for the removing of mercaptans from gasoline by treating said gasoline with caustic-methanol solution, separating caustic-methanol solution from treated oil, regenerating caustic solution by separating therefrom mercaptans and methanol, and further separating methanol from mercaptans, the method of avoiding plugging difficulties in treating the gasoline which comprises commingling at least a portion of the separated methanol with at least a portion of the regenerated caustic solution, passing the resultant mixture into an aging zone and retaining the same therein for a time of from about 10 minutes to about 12 hours at a temperature of from about atmospheric to about 200° F. whereby precipitate formation occurs, filtering the resultant mixture of caustic, methanol and precipitate to separate caustic-methanol from precipitate, and utilizing said separated caustic-methanol to treat gasoline as aforesaid.

3. In a process for the removing of mercaptans from gasoline by treating said gasoline with caustic-methanol solution, separating caustic-methanol solution from treated oil, regenerating caustic solution by separating therefrom mercaptans and methanol, and further separating methanol from mercaptans, the method of avoiding plugging difficulties in treating the gasoline which comprises washing the treated gasoline with water to remove entrained methanol, separating treated oil from water containing methanol, commingling at least a portion of said water containing methanol with at least a portion of said regenerated caustic solution, maintaining the thus commingled liquids in admixture for a time of from about 10 minutes to about 12 hours at a temperature of from about atmospheric to about 200° F. to form a precipitate, separating caustic solution from the precipitate, and utilizing at least a portion of the caustic to treat gasoline as aforesaid.

4. In a process for removing acidic components from hydrocarbons by treating said hydrocarbons with an alkaline reagent solution, separating alkaline reagent solution from treated hydrocarbons, and regenerating the alkaline reagent solution by separating acidic components therefrom, the method of avoiding plugging difficulties in treating the hydrocarbons which comprises commingling with at least a portion of the regenerated alkaline reagent a liquid diluent selected from the group consisting of methanol and water, passing the resultant mixture into an aging zone and retaining the same therein for a time of from about 10 minutes to about 12 hours at a temperature of from about atmospheric to about 200° F., wherein a precipitate is formed, separating alkaline solution from said precipitate, and utilizing said alkaline solution to treat hydrocarbons as aforesaid.

5. In a process for removing acidic components from hydrocarbon oil by treating said oil with an alkaline reagent-solvent solution, separating alkaline reagent-solvent solution from treated oil, regenerating alkaline reagent solution by separating therefrom acidic components and solvent, and further separating the solvent from acidic components, the method of avoiding plugging difficulties in treating said oil which comprises separately commingling with at least a portion of the regenerated alkaline reagent solution a liquid diluent selected from the group consisting of methanol and water, maintaining said alkaline reagent solution and said diluent in admixture for a time of from about 10 minutes to about 12 hours at a temperature of from about atmospheric to about 200° F., whereby a precipitate is formed, separating alkaline reagent solution from said precipitate, and utilizing said alkaline reagent solution to treat hydrocarbon oil as aforesaid.

6. In a process for removing acidic components from hydrocarbon oil by treating said oil with a caustic-methanol solution, separating caustic-methanol solution from treated oil, regenerating caustic solution by separating therefrom acidic components and methanol, and further separating methanol from acidic components, the method of avoiding plugging difficulties in treating said oil which comprises separately commingling with at least a portion of the regenerated caustic solution a liquid diluent selected from the group consisting of methanol and water, maintaining said caustic solution and said diluent in admixture for a time of from about 10 minutes to about 12 hours at a temperature of from about atmospheric to about 200° F., whereby a precipitate is formed, separating caustic solution from said precipitate, and utilizing said separated caustic solution to treat hydrocarbon oil as aforesaid.

7. The process of claim 6 further characterized in that said liquid diluent comprises methanol separated in the manner hereinbefore described, and the resultant mixture of caustic solution and methanol is utilized to treat hydrocarbon oil as aforesaid.

8. The process of claim 6 further characterized in that said liquid diluent comprises water.

9. The process of claim 6 further characterized in that the treated oil is washed with water to recover entrained methanol.

References Cited in the file of this patent

UNITED STATES PATENTS

| | | |
|---|---|---|
| 2,267,809 | Border | Dec. 30, 1941 |
| 2,270,491 | Yabroff | Jan. 20, 1942 |
| 2,538,287 | Voorhees | Jan. 16, 1951 |
| 2,556,414 | Brooks et al. | June 1, 1951 |